United States Patent [19]

Starr

[11] Patent Number: 5,664,957

[45] Date of Patent: Sep. 9, 1997

[54] TRACK AND FIXTURE DISPLAY BRACKET

[75] Inventor: Ronald N. Starr, Elk Grove Village, Ill.

[73] Assignee: Prestige Products, Inc., Elk Grove, Ill.

[21] Appl. No.: 732,830

[22] Filed: Oct. 15, 1996

Related U.S. Application Data

[63] Continuation of Ser. No. 510,915, Aug. 3, 1995.

[51] Int. Cl.$^6$ .................................................. H01R 4/60
[52] U.S. Cl. ............................................ 439/207; 362/249
[58] Field of Search ................................. 439/207, 216, 439/113, 114, 115; 362/249, 404

[56] References Cited

U.S. PATENT DOCUMENTS

| | | | |
|---|---|---|---|
| 1,817,034 | 8/1931 | Hotchkin | 439/207 |
| 2,209,560 | 7/1940 | Carlson | 439/114 |
| 3,355,627 | 11/1967 | Clement | 439/207 |
| 3,504,172 | 3/1970 | Liberman | 362/150 |
| 3,742,674 | 7/1973 | Lang | 52/666 |
| 4,872,849 | 10/1989 | Long | 439/211 |
| 5,131,860 | 7/1992 | Bogiel | 439/211 |
| 5,357,414 | 10/1994 | Dane et al. | 439/211 |

FOREIGN PATENT DOCUMENTS

| | | | |
|---|---|---|---|
| 1019043 | 10/1977 | Canada | 439/207 |
| 1427221 | 3/1976 | United Kingdom | 439/207 |
| 2095049 | 9/1982 | United Kingdom | 439/207 |

OTHER PUBLICATIONS

"Prestige Modular Lighting Display Systems" brochure published by Prestige Products, Inc., 12 pgs.

*Primary Examiner*—Neil Abrams
*Assistant Examiner*—T. C. Patel
*Attorney, Agent, or Firm*—Hill, Steadman & Simpson

[57] ABSTRACT

A modular lighting display system having an outlet track is provided. The outlet track includes a pair of sidewalls and a dividing wall having a first terminal end and a second terminal end. The dividing wall is located between the pair of sidewalls and extends from the first terminal end to the second terminal end of the outlet track. The dividing wall thereby defines a raceway portion and an outlet portion. The raceway portion and the outlet portion each have an open section. Electrical outlets are disposed along a length of the outlet portion of the outlet track. A pair of rails constructed and arranged at the open section of both the raceway portion and the outlet portion is provided. The modular lighting display system also has a fixture display bracket having at least one mounting tab constructed to span the open section of the outlet portion so that the bracket is supported on the pair of rails at the open section of the outlet portion. The fixture display bracket is capable of carrying a number of different fixtures and also has an individual power cord.

15 Claims, 3 Drawing Sheets

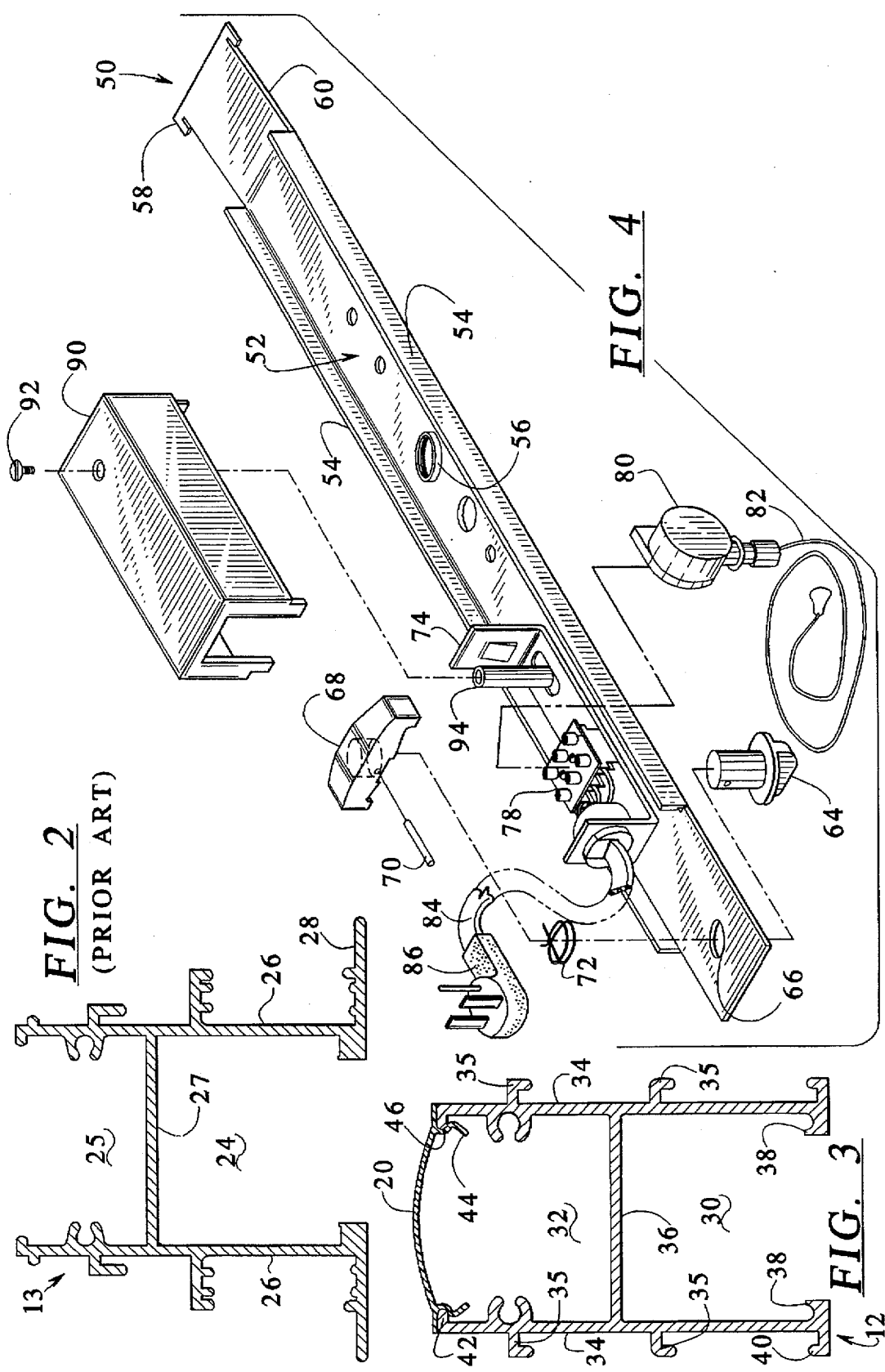

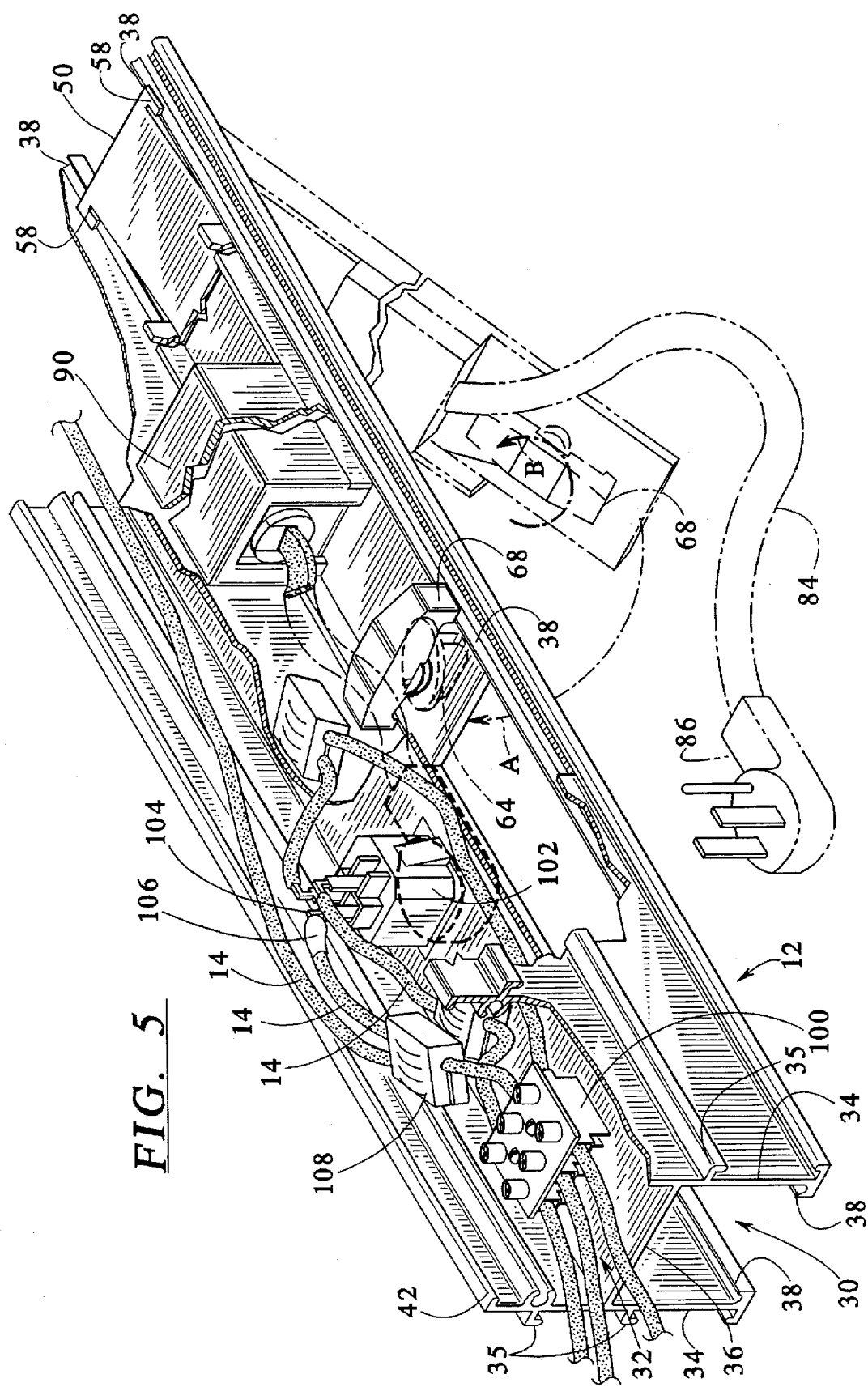

TRACK AND FIXTURE DISPLAY BRACKET

This is a continuation of application Ser. No. 08/510,915, filed Aug. 3, 1995.

BACKGROUND OF THE INVENTION

The present invention generally relates to track lighting fixtures and more specifically to a modular lighting display system having a track system including a plurality of outlet power connections and an accompanying raceway section for housing wires and cables.

Do-it-yourself home improvement has been very popular for the last several years. Contributing to the do-it-yourself popularity is the multitude of home building centers which cater to the do-it-yourselfer. These stores are often extremely large and have a great number of items on display.

For example, lighting fixtures and ceiling fans and the like are very common items which a do-it-yourselfer can install without much difficulty. Often, the lighting fixtures and ceiling fans are randomly arranged and difficult to move from a first display location to another display location. Further, it is often difficult to display a majority of available light fixtures as display space is limited and the quantity of different fixtures is great.

Thus, a need exists for an improved display track system that can accommodate a large number of light fixtures or ceiling fans, etc. to be displayed in a large home improvement center, for example.

SUMMARY OF THE INVENTION

A modular track system having a removable display bracket which provides ease in displaying and exchanging light fixtures from a display arrangement is provided in the present invention.

To this end, in an embodiment, a modular lighting display system is provided. The system comprises an outlet track having a first terminal end and a second terminal end. The outlet track includes a pair of sidewalls and a dividing wall located between the pair of sidewalls and extends from the first terminal end to the second terminal end of the outlet track. The dividing wall defines a raceway portion and an outlet portion of approximately equal size, wherein the raceway portion and the outlet portion each have an open section. A plurality of electrical outlets are disposed along a length of the outlet portion of the outlet track, and a pair of rails are constructed and arranged at the open section of both the raceway portion and the outlet portion of the outlet track. A fixture display bracket having at least one mounting tab is constructed to reside on the pair of rails at the open section of the outlet portion. The fixture display bracket has means for mounting a fixture thereto and a power cord. Also, a domed lid is provided for covering the raceway portion of the outlet track.

In an embodiment, the modular lighting display system further comprises at least one electrical connector located in the raceway portion connecting the plurality of electrical outlets disposed along a length of the outlet portion of the outlet track.

In an embodiment, the modular lighting display system further comprises at least one in-line connector to splice a plurality of wires between the at least one electrical connector and the plurality of electrical outlets.

In an embodiment, the modular lighting display system further comprises a lid constructed and arranged to mount to the open section of the raceway portion.

In an embodiment, the modular lighting display system further comprises at least one terminal block constructed and arranged in the raceway portion of the outlet track to interconnect the plurality of electrical outlets.

In an embodiment, the outlet track is extruded.

In an embodiment, the modular lighting display system further comprises a plastic dome constructed and arranged to cover the raceway portion of the outlet track.

In an embodiment, the modular lighting display system further comprises means for removably securing the fixture display bracket on the pair of rails at the open section of the outlet portion of the outlet track.

In an embodiment, the modular lighting display system further comprises a rotatable retaining arm constructed and arranged to selectively mount to the pair of rails at the open section of the outlet portion of the outlet track.

In an embodiment, the fixture display bracket is adjustably positionable within the outlet portion of the outlet track.

In an embodiment, the outlet track is constructed and arranged to longitudinally connect to at least one other outlet track.

In an embodiment, the modular lighting display system further comprises an extruded cover constructed and arranged to enclose the raceway portion of the outlet track.

In an embodiment, the modular lighting display system further comprises a terminal block connected to the power cord.

In an embodiment, the modular lighting display system further comprises a threaded hole located in the fixture display bracket.

In an embodiment, the plurality of electrical outlets are designed to conform with European standards.

In an embodiment, at least two outlet tracks are capable of supporting a ceiling panel therebetween.

In an embodiment, the modular lighting display system further comprises a lid constructed and arranged to press fit into the open section of the raceway portion of the outlet track.

In an embodiment, the raceway portion defines a space larger than a space defined by the outlet portion.

In an embodiment, the modular lighting display system further comprises at least one hanging rod connected to a hanging bracket to support the outlet track in a suspended position.

In an embodiment, the modular lighting display system further comprises means for longitudinally connecting an outlet track to another outlet track.

An advantage of the present invention is to provide a modular lighting display system including an outlet track having a raceway portion and an outlet portion wherein the raceway portion has a dome cover to provide for storage of wires and cabling.

Further advantages of the modular lighting display system will become apparent to one skilled in the art by referring to an exemplary embodiment shown in the figures and described below.

BRIEF DESCRIPTION OF THE DRAWINGS

FIG. 2 illustrates a cross-sectional view of a prior art output track.

3

Figure 1:
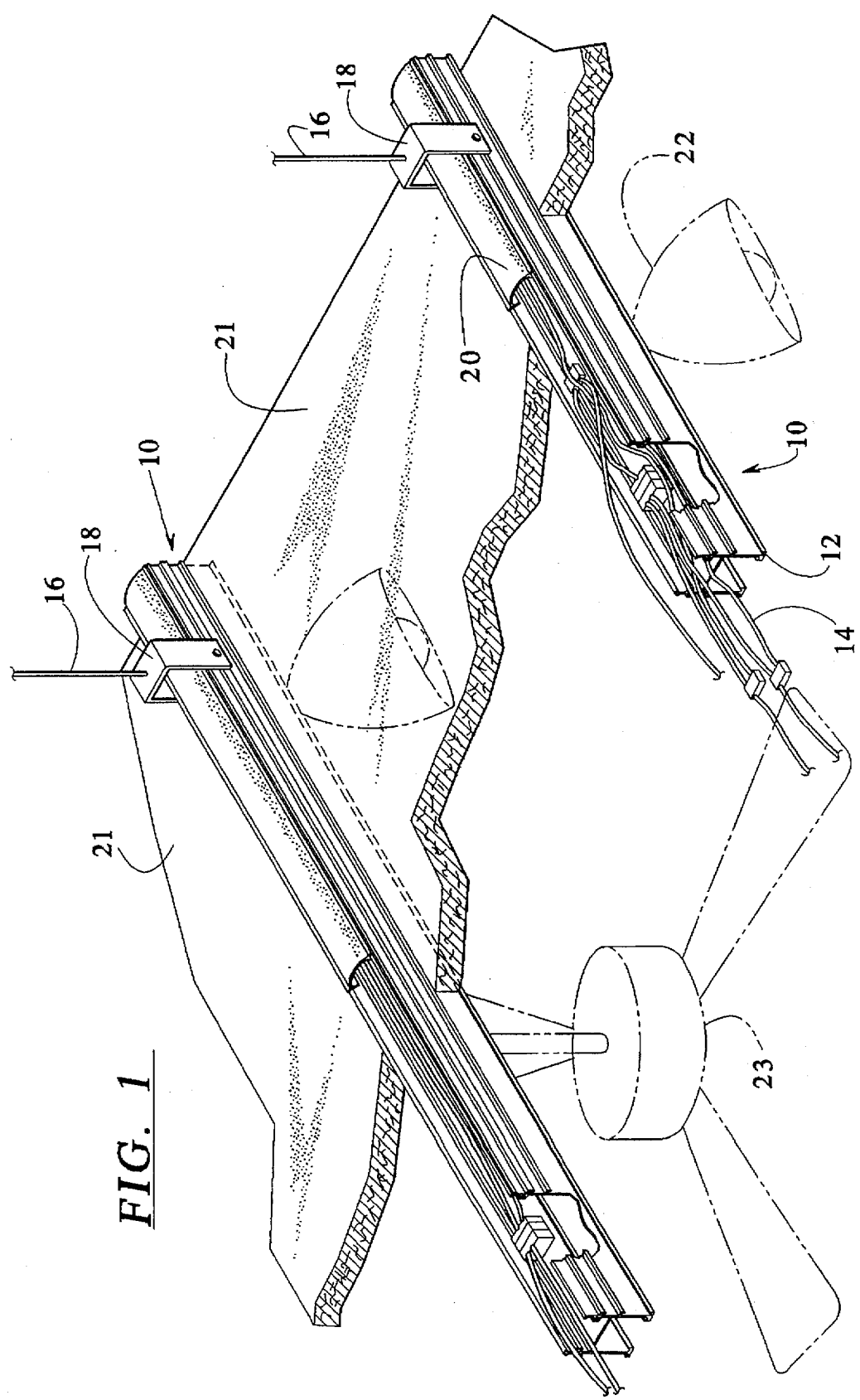
FIG. 1 illustrates a perspective view, partially in cross-section and partially in phantom, of an embodiment of a modular lighting display system of the present invention having a ceiling fan and light fixtures mounted thereto.

FIG. 3 illustrates a cross-sectional view of an embodiment of an outlet track of the present invention including a domed-cover.

FIG. 4 is an exploded perspective view of an embodiment of a lighting fixture display bracket of the present invention.

FIG. 5 is a perspective view of a portion of an embodiment of the modular lighting display system partially in cut-away cross section.

DETAILED DESCRIPTION OF THE PRESENTLY PREFERRED EMBODIMENTS

FIG. 1 illustrates an embodiment of a modular lighting display system 10 of the present invention. As shown, the modular lighting display system 10 has an outlet track 12. The outlet track 12 carries a plurality of wires 14. In a basic display setup, a desired number of outlet tracks 12 are hung from a ceiling via a rod 16 and a hanger bracket 18 connected to the outlet track 12. Enclosing the plurality of wires 14 is a domed cover 20. A ceiling tile 21 is located between the outlet tracks 12. The ceiling tiles 21 are supported by the outlet tracks 12. Also illustrated in FIG. 1 is a light fixture 22 and a ceiling fan 23. The light fixture 22 and the ceiling fan 23 are mounted for display on the display system 10. Such display mounting is described below with reference to FIGS. 4 and 5.

FIG. 2 illustrates a cross-sectional end view of a prior art example of an outlet track 13. The prior art outlet track 13 has an outlet portion 24 and a raceway portion 25. The portions 24, 25 are defined by side walls 26 and a dividing wall 27. The dividing wall 27 is located between the outlet portion 24 and the raceway portion 25. Significant material requirements are necessary to produce the prior art outlet track 13. Further, complex extrusion dies are required to produce the known outlet track 13. In addition, a decorative support flange 28 is provided.

FIG. 3 illustrates a cross-sectional end view of the outlet track 12 of the present invention. The outlet track 12 has an outlet portion 30 and a raceway portion 32. The embodiment shown in FIG. 3 includes a pair of sidewalls 34 which, along with a dividing wall 36, defines the outlet portion 30 and the raceway portion 32. In addition, a carrying rail 38 and a carrying tab 40 are provided on each of the sidewalls 34. The carrying tabs 40 may be used to support the ceiling tiles 21. Clips 35 are also provided exterior to the sidewalls 34. The clips 35 define the widest portion of the outlet track 12.

The raceway portion 32 further includes a cover tab 42 on each of the sidewalls 34. The domed cover 20 has a pair of flexible holding tabs 44 and a pair of detents 46. The detents 46 of the domed cover 20 can press fit into the cover tabs 42 of the raceway portion 32. Alternatively, the domed cover 20 can slide into and cover the raceway portion 32 by sliding in from an end of the outlet track 12. The domed cover 20 is preferably manufactured of a pliable material, such as plastic or a flexible metal. The domed cover 20 is also preferably extruded for easier and more economical production. The cover tab 42 in the raceway portion 32 of the sidewall 34 is cooperatively located in the detents 46 to firmly hold the resilient domed cover 20 at the top of the raceway portion 32. Thus, the raceway portion 32 can be fully enclosed for housing the plurality of wires 14 therein.

When the prior art outlet track 13 of FIG. 2 is compared to the embodiment of the outlet track 12 of the present invention as shown in FIG. 3, it is clear that the present invention requires substantially less material due to the reduction and elimination of elements, such as the decorative support flange 28. Further, the extrusion die capable of producing the outlet track 12 is significantly less complex than the die necessary to produce the prior art outlet track 13. Also, the embodiment of the present invention shown in FIG. 3 has a proportionally larger raceway portion 32 with respect to the outlet portion 30 than in the prior art embodiment shown in FIG. 2. This provides for greater storage space for cabling in the raceway portion 32. Also, the domed feature of the domed cover 20, when compared to the known flat raceway covers (not shown), provides greater storage capacity for the plurality of wires 14 in the raceway portion 32.

FIG. 4 illustrates an embodiment of a fixture display bracket 50 of the present invention. The fixture display bracket 50 includes a carrying plate 52 and sidewalls 54. A threaded hole 56 is provided in the carrying plate 52 for securing the light fixture 22 or the ceiling fan 23 to the fixture display bracket 50. The fixture display bracket 50 also has a pair of mounting tabs 58 which rest upon the carrying rails 38 when the fixture display bracket 50 is mounted into the outlet portion 30 of the outlet track 12. (See FIG. 5 and the accompanying description below.)

The fixture display bracket 50 also has a bent portion 60 located near the end which has the mounting tabs 58. At the opposite end of the fixture display bracket 50, a knob 64 is disposed through a hole 66 in the carrying plate 52 of the fixture display bracket 50. The knob 64 also operatively connects to a latch 68 via a pin 70 and a spring 72.

Also, a housing bracket 74 is located on the carrying plate 52 of the fixture display bracket 50. The housing bracket 74 is provided to enclose a terminal block 78 or a pull switch 80 having a pull string 82 for activating power to the fixture display bracket 50. The terminal block 78 or the pull switch 80 is connected to a power cord 84 having a plug 86 at the end thereof. The plug 86 can, of course, have many different configurations depending on how and where it is intended to be used. For example, different plug types are used in European applications that conform to the standards and requirements of those countries. In addition, a housing 90 is provided to enclose the terminal block 78 or the pull switch 80 for safe operation. The housing 90 is secured to the housing bracket 74 by a fastener 92, (a screw is shown in FIG. 4), connected into a stand-off 94. The Combination of the outlet track 12 and the cooperating fixture display bracket 50 is illustrated in FIG. 5 and described below.

FIG. 5 illustrates an embodiment of the outlet track 12 of the present invention as used in conjunction with the fixture display bracket 50, wherein like numerals represent like parts. As shown, the fixture display bracket 50 may be mounted in the outlet portion 30 of the outlet track 12. This is done by resting the mounting tabs 58 on the carrying rails 38. Then, the fixture display bracket 50 pivots about the mounting tabs 58 in the direction of arrow A until the fixture display bracket 50 is relatively horizontal within the outlet portion 30. The bent portion 60 of the fixture display bracket 50 provides for the flush horizontal orientation of the fixture display bracket 50 within the outlet portion 30 of the outlet track 12. Then, the knob 64 is rotated in the direction of arrow B to rotate the latch 68 so that it rests upon the carrying rails 38 as shown in FIG. 5.

Also shown in FIG. 5 is the raceway portion 32 of the outlet track 12. The plurality of wires 14 are connected between a terminal block 100 and an outlet socket 102. The outlet socket 102 has a plurality of prongs 104 to which the plurality of wires 14 connect. In addition, a piece of shrink wrap 106 can be used to secure the wire 14 to the prong 104. Furthermore, junctions are made by inline splicing connectors 108 for splicing the wires 14. In this manner, using the terminal block 100 and the inline splicing connectors 108, a number of outlet tracks 12 can be connected together in a line. This is especially useful in the creation of a large display area.

Although the present invention has been described with reference to mounting of the track on a ceiling, it should be understood that the track may be mounted vertically, for example, on a wall or, alternatively, horizontally on the floor.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A modular lighting display system comprising:

an outlet track having a first width and a first terminal end and a second terminal end, the outlet track including a pair of sidewalls and a dividing wall located between the pair of sidewalls and extending from the first terminal end to the second terminal end of the outlet track, the dividing wall defining a raceway portion and an outlet portion of approximately equal size, the raceway portion and the outlet portion each having an open section wherein the first width of the outlet track is extended exterior to each of the sidewalls by integrally formed clips forming a second width of the outlet track wherein the clips extend equidistantly from the sidewalls and are spaced along a height of the sidewalls wherein the second width is a maximum width of the outlet track;

a plurality of electrical outlets disposed along a length of the outlet portion of the outlet track;

a pair of rails constructed and arranged at the open section of each of the raceway portion and the outlet portion of the outlet track;

a fixture display bracket having at least one mounting tab, constructed to reside on the pair of rails at the open section of the outlet portion, the fixture display bracket having means for mounting a fixture thereto and a power cord; and a domed lid covering and completely enclosing the raceway portion of the outlet track wherein the domed lid is mounted to the pair of rails of the open section of the raceway portion.

2. The modular lighting display system of claim 1 further comprising:

at least one terminal block constructed and arranged in the raceway portion of the outlet track to interconnect the plurality of electrical outlets.

3. The modular lighting display system of claim 1 wherein the outlet track is extruded.

4. The modular lighting display system of claim 1 further comprising:

means for removably securing the fixture display bracket on the pair of rails at the open section of the outlet portion of the outlet track.

5. The modular lighting display system of claim 1 further comprising:

a rotatable retaining arm constructed and arranged to selectively mount to the pair of rails at the open section of the outlet portion of the outlet track.

6. The modular lighting display system of claim 1 wherein the fixture display bracket is adjustably positionable within the outlet portion of the outlet track.

7. The modular lighting display system of claim 1 wherein the lid is extruded.

8. The modular lighting display system of claim 1 further comprising:

a terminal block connected to the power cord.

9. The modular lighting display system of claim 1 further comprising:

a threaded hold located in the fixture display bracket.

10. The modular lighting display system of claim 1 wherein at least two outlet tracks are capable of supporting a ceiling panel therebetween.

11. The modular lighting display system of claim 1 wherein the lid is constructed and arranged to press fit into the open section of the raceway portion of the outlet track.

12. The modular lighting display system of claim 1 wherein the raceway portion defines a space larger than a space defined by the outlet portion.

13. The modular lighting display system of claim 1 further comprising:

at least one hanging rod connected to a hanging bracket to support the outlet track in a suspended position.

14. The modular lighting display system of claim 1 further comprising:

at least one electrical connector located in the raceway portion connecting the plurality of electrical outlets disposed along a length of the outlet portion of the outlet track.

15. The modular lighting display system of claim 14 further comprising:

at least one in-line connector to splice a plurality of wires between the at least one electrical connector and the plurality of electrical outlets.

* * * * *